(12) United States Patent
Wang

(10) Patent No.: US 10,569,791 B2
(45) Date of Patent: Feb. 25, 2020

(54) RAILWAY VEHICLE AND JOINT CONNECTOR THEREOF

(71) Applicant: CRRC QIQIHAR ROLLING STOCK CO., LTD., Heilongjiang (CN)

(72) Inventor: Xiaolong Wang, Heilongjiang (CN)

(73) Assignee: CRRC Qiqihar Rolling Stock Co., Ltd. (CN)

( * ) Notice: Subject to any disclaimer, the term of this patent is extended or adjusted under 35 U.S.C. 154(b) by 277 days.

(21) Appl. No.: 15/544,895

(22) PCT Filed: Jul. 27, 2016

(86) PCT No.: PCT/CN2016/091904
§ 371 (c)(1),
(2) Date: Jul. 20, 2017

(87) PCT Pub. No.: WO2017/016482
PCT Pub. Date: Feb. 2, 2017

(65) Prior Publication Data
US 2018/0009452 A1   Jan. 11, 2018

(30) Foreign Application Priority Data
Jul. 29, 2015   (CN) .......................... 2015 1 0455475

(51) Int. Cl.
| *B61G 1/32* | (2006.01) |
| *B61G 5/02* | (2006.01) |
| *F16C 11/06* | (2006.01) |
| *B61G 7/00* | (2006.01) |
| *B61G 1/02* | (2006.01) |

(52) U.S. Cl.
CPC ................ *B61G 1/32* (2013.01); *B61G 5/02* (2013.01); *B61G 7/00* (2013.01); *F16C 11/069* (2013.01); *F16C 11/0647* (2013.01); *B61G 1/02* (2013.01); *F16C 11/06* (2013.01); *F16C 2326/10* (2013.01)

(58) Field of Classification Search
CPC ... B61G 1/00; B61G 1/02; B61G 1/10; B61G 1/18; B61G 1/28; B61G 1/32; B61G 1/40; B61G 3/00; B61G 5/00; B61G 5/02; B61G 9/00; B61G 9/04
See application file for complete search history.

(56) References Cited

U.S. PATENT DOCUMENTS 4,580,686 A   4/1986 Elliot
4,946,052 A   8/1990 Kaim et al.
(Continued)

FOREIGN PATENT DOCUMENTS

CN   201009892 Y   1/2008
CN   103523044 A   1/2014
(Continued)

*Primary Examiner* — Robert J MCarry, Jr.
(74) *Attorney, Agent, or Firm* — BakerHostetler

(57) ABSTRACT

A joint connector of a railway vehicle comprises a concave joint (22) and a convex joint (21). A traction load transfer section and/or a compression load transfer section are provided between the concave joint and the convex joint. The traction load transfer section and the compression load transfer section are detachable assembled in the concave joint. The service life of the concave joint is prolonged due to the arrangement of the traction load transfer section and the compression load transfer section.

16 Claims, 12 Drawing Sheets

(56) References Cited

U.S. PATENT DOCUMENTS

| | | | |
|---|---|---|---|
| 5,000,330 A * | 3/1991 | Kaim | B61G 9/00 |
| | | | 213/61 |
| 5,035,338 A | 7/1991 | Kaufhold et al. | |
| 5,097,973 A | 3/1992 | Spencer | |
| 5,115,926 A | 5/1992 | Kaufhold | |
| 5,520,295 A | 5/1996 | Wiebe | |

FOREIGN PATENT DOCUMENTS

| | | | |
|---|---|---|---|
| CN | 104960541 A | 10/2015 | |
| CN | 204750191 U | 11/2015 | |
| CN | 20511356 U | 3/2016 | |
| EP | 1084929 A2 | 3/2001 | |
| GB | 431194 A | 6/1935 | |
| JP | H11245812 A | 9/1999 | |
| RU | 2230675 C1 | 6/2004 | |

\* cited by examiner

RAILWAY VEHICLE AND JOINT CONNECTOR THEREOF

This application is the national phase of International Application No. PCT/CN2016/091904, titled "RAILWAY VEHICLE AND JOINT CONNECTOR THEREOF", filed on Jul. 27, 2016 which claims priority to Chinese Patent Application No. 201510455475.4, titled "RAILWAY VEHICLE AND JOINT CONNECTOR THEREOF", filed with the Chinese State Intellectual Property Office on Jul. 29, 2015, the entire disclosures of which applications are incorporated herein by reference.

FIELD

The present application relates to the technical field of railway vehicles, more particularly to a railway vehicle and a joint connector thereof.

BACKGROUND

A joint connector is a connecting device arranged between vehicles for connecting adjacent vehicles. For railway vehicles, the use of the joint connector allows adjacent cars to be supported on one bogie together, thus saving the number of bogies and reducing the mass of a train.

Reference is made to FIG. 1, which shows the structure of a typical joint connector.

The joint connector (SAC-1 type) includes a convex joint 11, a concave joint 12, a joint bearing 13, a bearing pin 131, a disc spring 14, a wedge 16, a bolt 15, a nut 18, a gasket 17, a dust cover 121 and the like.

The joint bearing 13 is fixed to the convex joint 11, and a transverse bearing pin 131 is provided in the joint bearing 13. In FIG. 1, the concave joint 12 has a transverse mounting hole, and the concave joint 12 for accommodating the joint bearing 13 falls from upside to downside, so that the joint bearing 13 is placed in the transverse mounting hole from upside to downside, and thus front-rear displacement and left-right displacement of the joint bearing 13 are restricted. In addition, the wedge 16 is provided on each of two sides of the concave joint 12, and is fixed in the concave joint 12 by means of a bolt 15 vertically inserted. As illustrated, the bolt 15 in turn passes through the disc spring 14, the wedge 16 and the gasket 17 in a vertical direction, and is then inserted into the concave joint 12 and fixed by the nut 18.

A bevel 131a is provided at each of two ends of the bearing pin 131, and is at an angle of about 10 degrees with respect to the vertical direction. After the two wedges 16 are positioned, bevels 131a of the two wedges 16 at the two sides cooperate with the bevels 131a at two ends of the bearing pin 131 to form a self-locking, so that a connection gap between the concave joint and the convex joint 11 is eliminated. Even when the wedge 16 is worn, the self-locking is always formed between the wedge 16 and the bevel 131a of the bearing pin 131 under the action of the disc spring 14.

Since the above-mentioned joint connector is horizontally, vertically and laterally rotated by the joint bearing 13, the connector is primarily subjected to a longitudinal traction, a compressive force, and a vertical load of the vehicle. Specifically, the transmission paths of the load in various directions are as follows, traction force: from the convex joint 11 through the joint bearing 13 and the bearing pin 131 to the concave joint 12;

compressive force: from the convex joint 11 through the joint bearing 13, the bearing pin 131 and the wedge 16 to the concave joint 12;

vertical force: from the convex joint 11 through the joint bearing 13 to the concave joint 12.

The above joint connector has the following technical issues.

Firstly, the traction force or the compressive force of the vehicle may act on the concave joint 12 by the joint bearing 13, therefore, the concave joint 12 is apt to be worn. Further the concave joint 12 and the convex joint 11 are both fixed to the vehicle by welding, and the concave joint 12 is expensive and hard to repair. Generally, if the concave joint 12 is worn and cannot be used, the entire car body may be unserviceable accordingly.

Secondly, the traction force, the compression force and the vertical force of the vehicle all act on the concave joint 12 via the joint bearing 13, therefore, the requirements posed on the joint bearing 13 are very strict and the service life of the joint connector relies on the service life of the joint bearing 13 to a large extent.

Thirdly, the traction force and the compressive force are transmitted through the bearing pin 131, therefore the bearing pin 131 and the joint bearing 13 are integrally arranged to meet the strength requirement. In this case, the joint bearing 13 can only be placed into the transverse mounting hole of the concave joint 12 from upside to downside, thus, it is necessary to jack up the car body provided with the convex joint 11, and then perform subsequent assembly. Therefore, the assembly process is cumbersome and difficult.

In view of this, a technical issue to be addressed by those skilled in the art is to improve wear of the concave joint and prolong the service life of the concave joint and even the entire vehicle.

SUMMARY

A railway vehicle and a joint connector thereof are provided according to the present application, which can mitigate the wear of the concave joint, prolong the service life of the concave joint and thus prolonging the service life of the vehicle.

The joint connector according to the present application includes a concave joint and a convex joint, between which a traction force and a compressive force are transmittable, wherein a traction force transmission member is provided between the concave joint and the convex joint to transmit traction force, and/or a compressive force transmission member is provided between the concave joint and the convex joint to transmit compressive force, the traction force transmission member and the compressive force transmission member are detachably mounted and positioned in the concave joint.

In the present solution, when various loads are transmitted between the convex joint and the concave joint, the convex joint does not directly contact with the concave joint, but transmits a force to the concave joint through the traction force transmission member and the compressive force transmission member. The traction force transmission member and the compressive force transmission member are fixedly positioned relative to the concave joint after being mounted, so that when the convex joint is relatively moved (mainly including horizontal rotation, up-down swing, sideward roll and the like) relative to the concave joint, portions to be worn are the traction force transmission member and the compressive force transmission member, and the concave joint may not be worn. The traction force transmission member and the compressive force transmission member are detachably arranged in the concave joint, and these worn components pertain to members easily replaced. Therefore, the service life of the concave joint is prolonged and the service life of the vehicle can be prolonged accordingly.

After being mounted, the traction force transmission member and/or the compressive force transmission member are tightly pressed against the concave joint, so as to achieve mounting and positioning with respect to the concave joint and transmit the traction force or the compressive force correspondingly.

The convex joint is connected to the concave joint by a joint bearing, a traction pin is provided in the joint bearing and is configured to transmit the traction force to the traction force transmission member.

The traction force transmission member is provided with a support portion matching with an outer periphery of the traction pin, and an end portion of the traction pin is arranged in the support portion.

The support portion has an arc-shaped lateral side.

The traction force transmission member has an outer periphery fitted with an inner cavity of the concave joint to allow the traction force transmission member to be radially positioned in the inner cavity of the concave joint after being fitted.

The traction force transmission member includes an annular main body and a support claw projecting from the surface of the annular main body, the support portion is formed in the support claw, and the annular main body has an outer periphery fitted with the inner cavity of the concave joint.

An outer peripheral surface of the annular main body includes a first arc-shaped surface and a second arc-shaped surface arranged opposite to each other, and side flat surfaces located on two sides of the annular main body. The first arc-shaped surface and the second arc-shaped surface are fitted with a top surface and a bottom surface of the concave joint respectively, and two sides of an inner wall of the concave joint is provided with shoulders configured to contact with the side flat surfaces and abutting against the side flat surfaces respectively.

An inner side of the traction force transmission member is arranged in a bevel extending outwards from front to rear, and the support claw is arranged in a bevel extending inwards from the front to the rear.

The traction force transmission member is in surface contact with the inner wall of the concave joint in a transmission direction of the traction force.

The joint connector further includes a slave plate and a first wedge provided between the convex joint and the concave joint. A self-locking is formed between one side of the slave plate and one side of the first wedge, a spherical fit is formed between another side of the slave plate and a head portion of the convex joint; the compressive force transmission member includes a second wedge provided between the first wedge and the concave joint, a self-locking is formed between the second wedge and another side of the first wedge.

A support block is provided between the bottom of the concave joint and the convex joint, and a spherical fit is formed between the support block and the head portion of the convex joint.

A stopper configured to restrict a transverse displacement of the support block is provided at the bottom of the concave joint.

A wear-resistant bushing, which is in spherical surface contact with the head of the concave joint, is provided at a side, facing toward the convex joint, of the support block and/or the slave plate, and the strength of the wear-resistant bushing is less than the strength of the convex joint.

The support block and the slave plate are formed integrally.

A railway vehicle is further provided according to the present application, which includes multiple car bodies, and adjacent two car bodies are connected by a joint connector. The joint connector is the joint connector according to any one of above aspects. As the joint connector has the above technical effects, the railway vehicle also has the same technical effects.

Figure 1:
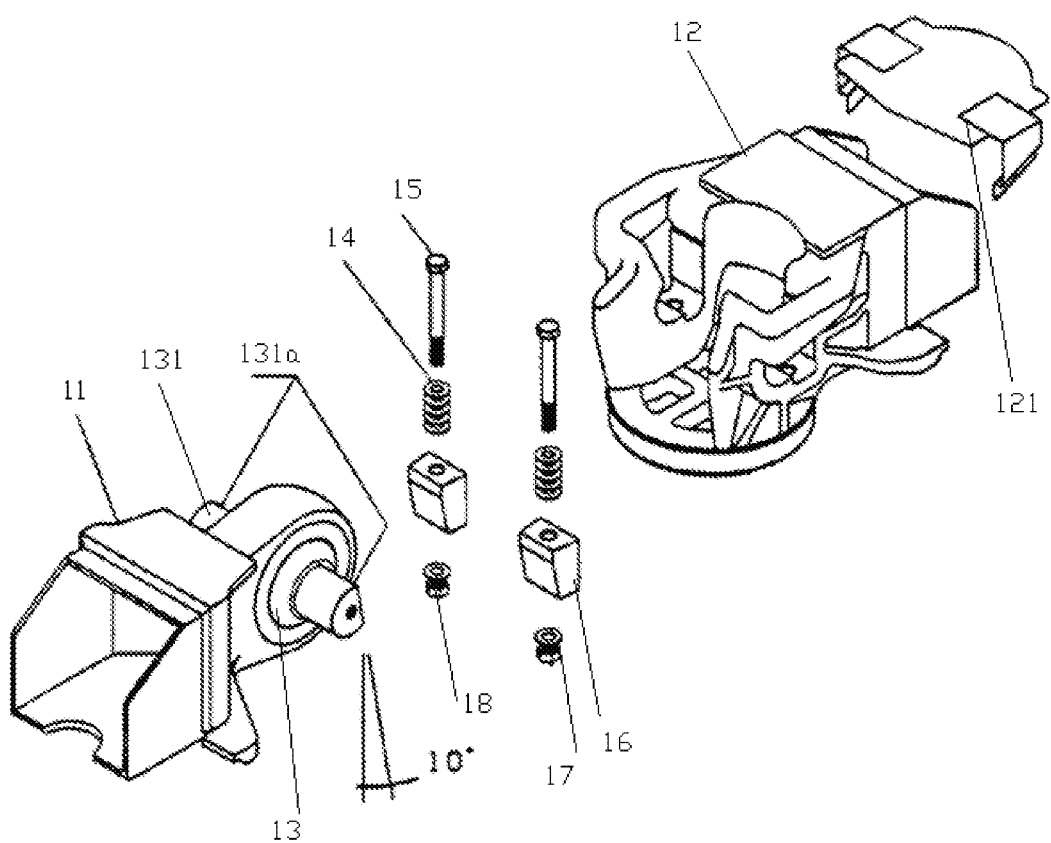
FIG. 1 shows the structure of a typical joint connector.

Reference numerals in FIG. 1:

| 11 convex joint, | 12 concave joint, |
| 121 dust cover, | 13 joint bearing, |
| 131 bearing pin, | 131a bevel, |
| 14 disc spring, | 15 bolt, |
| 16 wedge, | 17 washer, |
| 18 nut. | |

Reference numerals in FIGS. 2-15:

| 21 convex joint, | 211 retaining ring, |
| 22 concave joint, | 221 assembly and disassembly process hole, |
| 222 pin holder mounting flange, | 223 shoulder, |
| 224 stopper, | 225 upper center plate, |
| 226 front end, | 227 wedge process hole, |
| 228 process slot, | 229a welding groove, |

-continued

| | |
|---|---|
| 229b semicircular opening, | 229c tail bevel, |
| 23 joint bearing, | 231 traction pin, |
| 232 shaft sleeve, | 24 conversion sleeve, |
| 241 first arc-shaped surface, | 241a first spherical edge, |
| 242 second arc-shaped surface, | 242a second spherical surface, |
| 243 support claw, | 243a support portion, |
| 243b outer bevel, | 244 side flat surface, |
| 245 traction force transmission surface, | 246 inner bevel, |
| 25 slave plate, | 251 slave plate wear-resistant bushing, |
| 26 first wedge, | 27 second wedge, |
| 271 rib, | 28 pin holder, |
| 29 support block, | 291 support wear-resistant bushing. |

DETAILED DESCRIPTION

For enabling those skilled in the art to better understand the technical solution of the present application, the present application is further described in detail hereinafter with reference to the drawings and embodiments.

Figure 2:
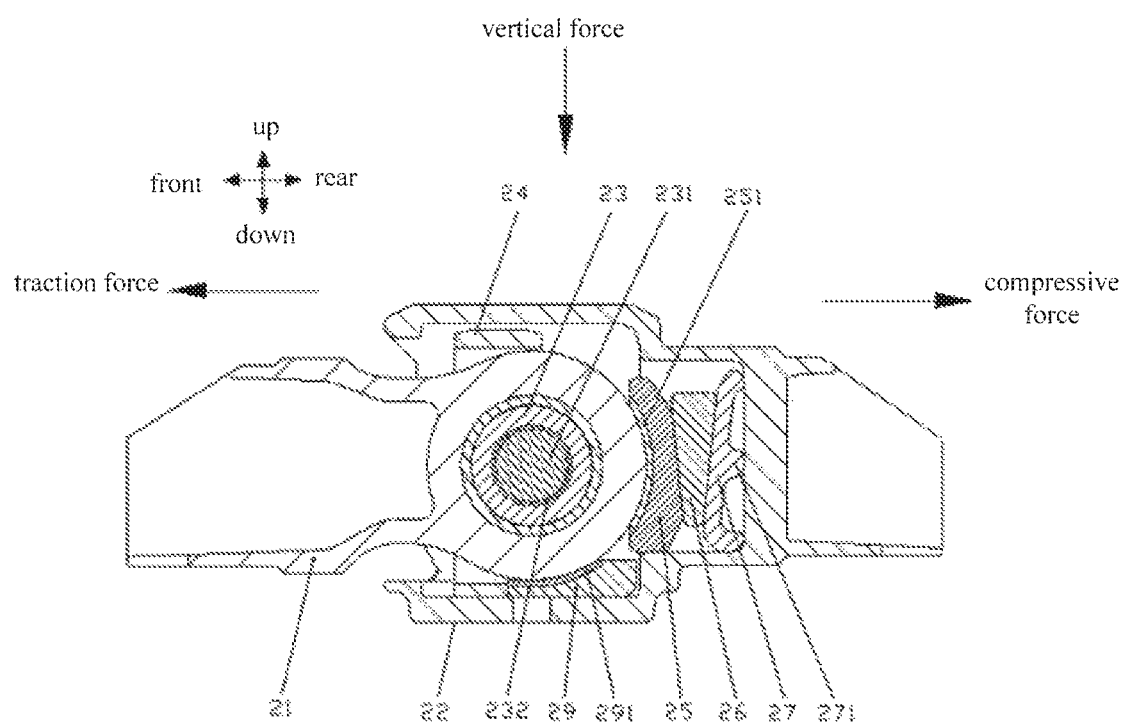
FIG. 2 is a schematic view showing the structure of a joint connector according to an embodiment of the present application.
Figure 3:
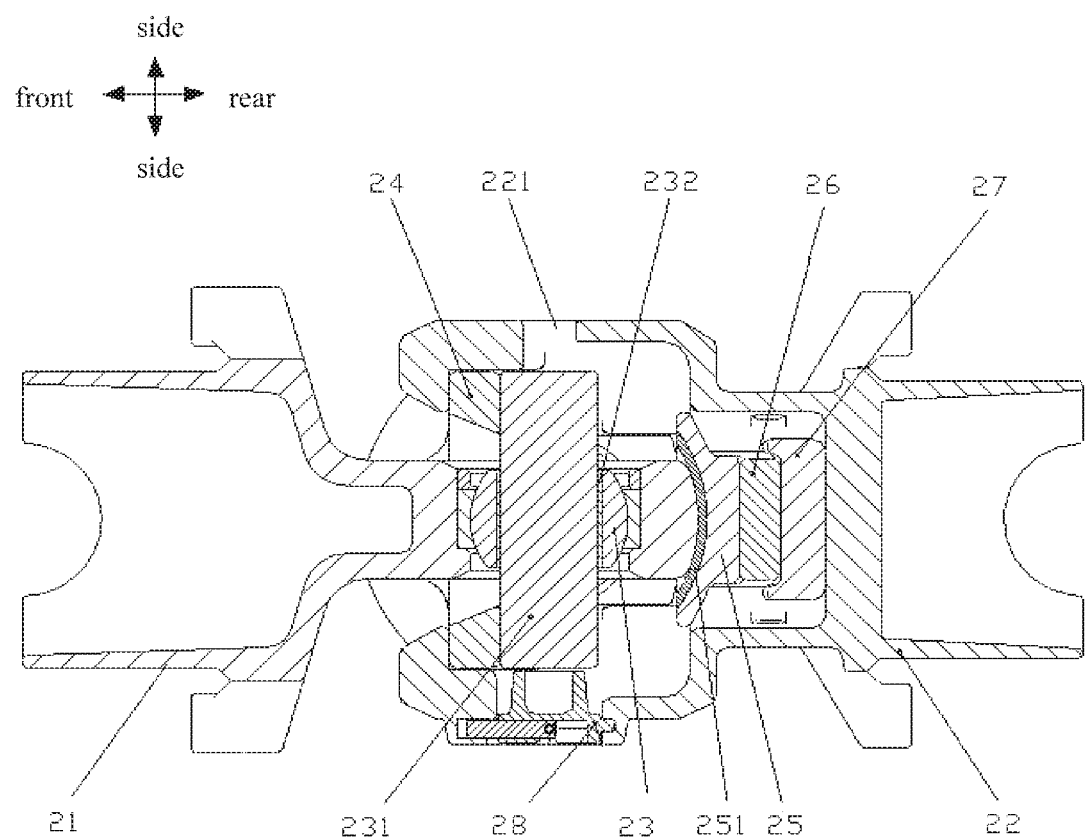
FIG. 3 is a top sectional view of the joint connector in FIG. 2.

It should be noted that the orientation terms such as front, rear, upper, lower and lateral sides described herein can be understood with reference to FIGS. 2 and 3, front is a direction in which the car body travels, rear is a direction opposite to front, and upper and lower are the orientations when the vehicle is in the normal state. In addition, the axial direction refers to an axial direction of the concave joint (in parallel with the front-rear direction), and the radial direction is a direction perpendicular to the axial direction.

Referring to FIGS. 2 to 3. FIG. 2 is a schematic view showing the structure of a joint connector according to an embodiment of the present application; and FIG. 3 is a top sectional view of the joint connector in FIG. 2.

A joint connector in this embodiment includes a concave joint 22 and a convex joint 21 for connecting two car bodies adjacent to each other. The concave joint 22 is connected to the convex joint 21 by a joint bearing 23. The convex joint 21 transmits a traction force, a compressive force and a vertical force to the concave joint 22 by the joint bearing 23, and the directions of these forces are indicated in the figures.

In this embodiment, the joint bearing 23 is provided with a traction pin 231 which is inserted in the joint bearing 23.

Figure 4:
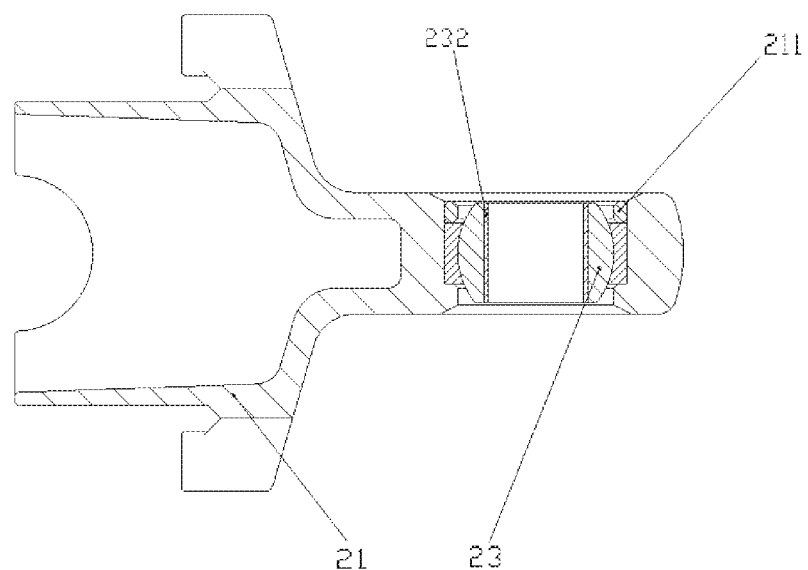
FIG. 4 is a schematic view showing the structure of the convex joint in FIG. 3 installed with a joint bearing.

As shown in FIG. 4, FIG. 4 a schematic view showing the structure of the convex joint in FIG. 3 installed with a joint bearing.

The convex joint 21 is provided with a mounting hole into which the joint bearing 23 is press-fitted. The joint bearing 23 is fixed in the mounting hole by means of a retaining ring 211, which may be welded and fixed to the convex joint 21. In addition, a shaft sleeve 232 is press-fitted inside the joint bearing 23, and the traction pin 231 cooperates with the shaft sleeve 232 after being inserted into the joint bearing 23.

Figure 5:
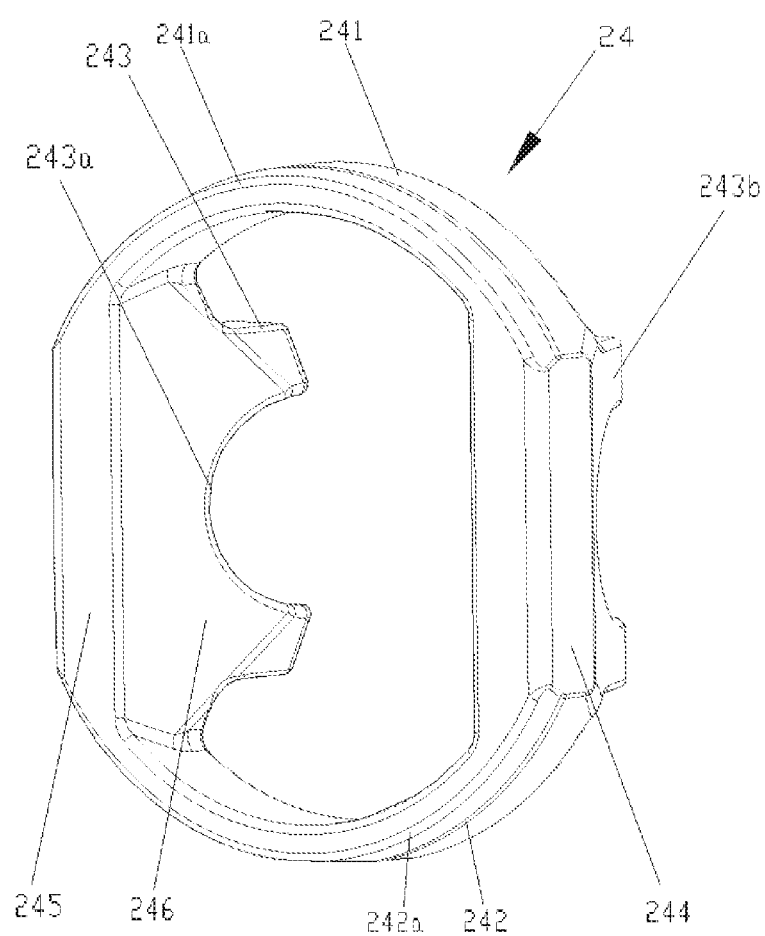
FIG. 5 is a schematic view showing the structure of a conversion sleeve in FIG. 2.
Figure 6:
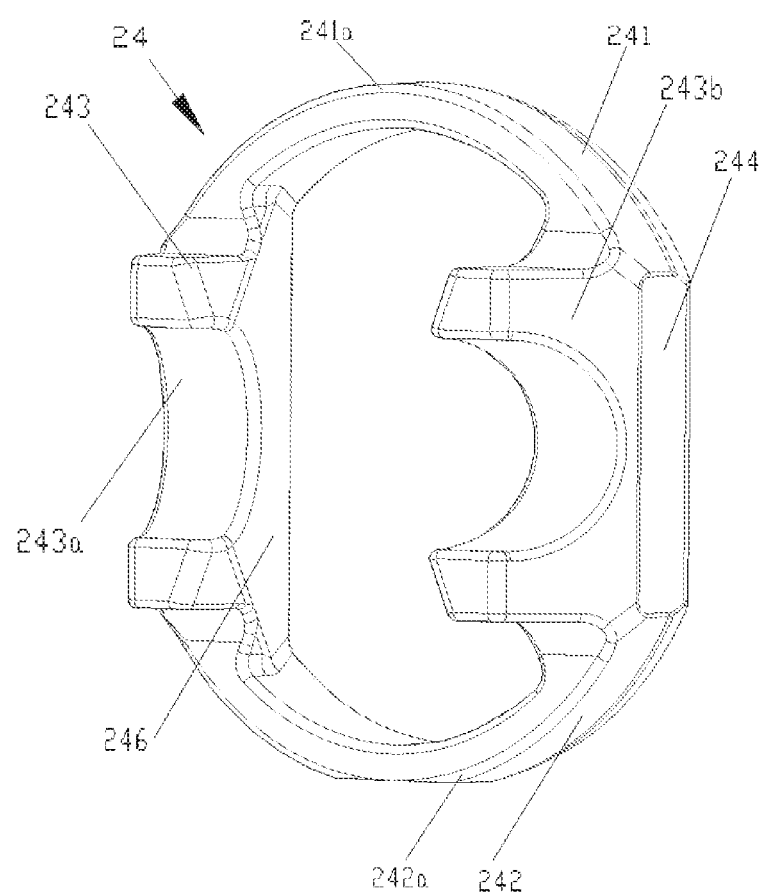
FIG. 6 is a schematic view showing the structure of the conversion sleeve in FIG. 5 viewed from another angle.
Figure 7:
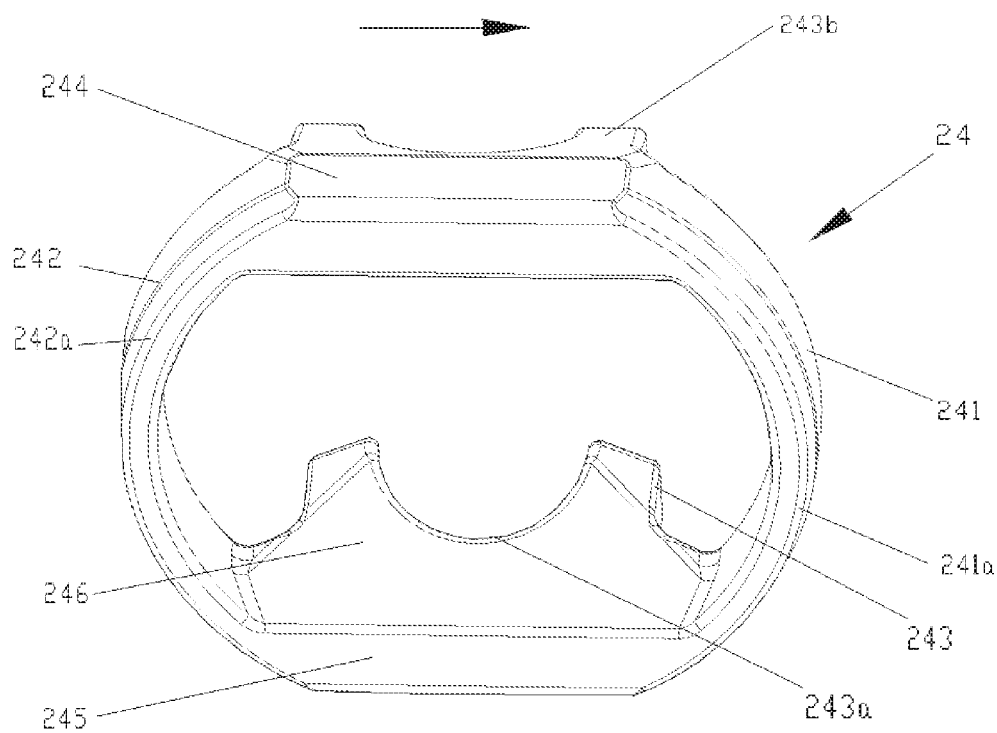
FIG. 7 is a schematic view of an initial state of the conversion sleeve in FIG. 2 when being mounted in a concave joint.

Referring to FIGS. 5 to 7, FIG. 5 is a schematic view showing the structure of a conversion sleeve in FIG. 2; FIG. 6 is a schematic view showing the structure of the conversion sleeve in FIG. 5 viewed from another angle; FIG. 7 is a schematic view of an initial state of the conversion sleeve in FIG. 2 mounted into a concave joint.

In this embodiment, the joint connector is also provided with a traction force transmission member, which is specifically a conversion sleeve 24 shown in FIG. 5. The conversion sleeve 24 includes an annular main body, which has an end surface configured to abut against the concave joint 22 to transmit the traction force, i.e., a traction force transmission surface 245 shown in the Figure, and another end surface which is provided with a support claw 243 protruding from the surface. A support portion 243a having an arc-shaped lateral side is formed in the support claw 243. The support portion 243a matches with an outer periphery of the traction pin 231 exactly (in the case that the traction pin 231 is a cylinder, the support portion 243a has a cylindrical surface as shown in FIG. 5). The support portion 243a may be a semi-circular arc, thus can stably cooperate with the traction pin 231; the annular main body is fitted with an inner cavity of the concave joint 22, i.e., the annular main body is substantially fixedly positioned radially after being arranged within the concave joint 22.

In addition, the joint connector also includes a compressive force transmission member, as shown in FIGS. 2 and 3. The joint connector is specifically further provided with a slave plate 25, a first wedge 26, and a second wedge 27 which is namely the compressive force transmission member. The convex joint 21 has a head portion facing toward the concave joint 22. The slave plate 25, the first wedge 26 and the second wedge 27 are provided in the listed sequence between the head portion of the convex joint 21 and the concave joint 22. A self-locking may be formed between the slave plate 25 and one side (front side) of the first wedge 26 and is also formed between the second wedge 27 and another side (rear side) of the first wedge 26, thus gap between the convex joint 21 and the concave joint 22 can be automatically eliminated by the inclined wedge principle.

A support block 29 may further be provided between a bottom of the concave joint 22 and the convex joint 21, and a spherical fit is formed between the support block 29 and the convex joint 21.

The joint connector may be installed as follows.

the conversion sleeve 24, the slave plate 25, the first wedge 26, the second wedge 27 and the support block 29 are placed in the concave joint 22;

the convex joint 21 fitted with the joint bearing 23 is inserted horizontally rearward into the concave joint 22 so that the head portion of the convex joint 21 tightly abuts the slave plate 25, the first wedge 26 and the second wedge 27 against the inner wall of the concave joint 22;

the traction pin 231 is inserted into the joint bearing 23 from a lateral side of the concave joint 22. At this time, the traction pin 231 is just located in the arc-shaped support portion 243a of the support claw 243 of the conversion sleeve 24 (during operation, the traction pin 231 may tightly abut the conversion sleeve 24 against the inner wall of the concave joint 22); and a pin holder 28 is mounted to axially position the traction pin 231 in the concave joint 22.

In this solution, the structures of the conversion sleeve 24, the slave plate 25, the wedges and the support block 29 are designed to appropriately distribute the transmission of the load as follows.

traction force: the convex joint 21—the joint bearing 23—the traction pin 231—the conversion sleeve 24—the concave joint 22;

compression force: the convex joint 21—the slave plate 25—the first wedge 26—the second wedge 27—the concave joint 22;

vertical force: the convex joint 21—the support block 29—the concave joint 22.

Accordingly, in this solution, when being transmitted from the convex joint 21 to the concave joint 22, each force may not directly contact with the concave joint 22, but may be transmitted to the concave joint 22 through the conversion sleeve 24, the second wedge 27 and the support block 29. The conversion sleeve 24, the second wedge 27 and the support block 29 are fixedly positioned relative to the concave joint 22 after being mounted, such that when the convex joint 21 is relatively moved (mainly including horizontal rotation, up-down swing, rolling sideward and the like) relative to the concave joint 22, portions to be worn are the conversion sleeve 24, the second wedge 27 and the support block 29, rather than the concave joint 22. These worn components are detachably provided in the concave joint 22 and are components easy to replace. Therefore, the service life of the concave joint 22 can be prolonged and accordingly, the service life of the vehicle can be prolonged.

It is to be understood that in the above embodiment, the conversion sleeve 24 is provided as the traction force transmission member, the second wedge 27 is provided as the compressive force transmission member and the support block 29 is provided as a vertical force transmission member. In fact, providing a force transmission member fixedly positioned relative to the concave joint 22 in any one of the force transmission directions to subject to wearing caused by the corresponding forces for the concave joint 22 can just reduce the wear of the concave joint 22 to a certain extent. Of course, providing the force transmission member in each of the force transmission directions is obviously the best embodiment for protecting the concave joint 22.

In addition, in the above-mentioned embodiment, the traction force transmission member is specifically embodied as the conversion sleeve 24 and the outer periphery of the annular main body of the conversion sleeve 24 is fitted with the inner cavity of the concave joint 22, so that the traction pin 231 of the joint bearing 23 directly presses tightly against the conversion sleeve 24 after the conversion sleeve 24 is mounted, thus achieving the positioning of the conversion sleeve 24 with respect to the concave joint 22 easily, and the positioning can be reliable. When it is required to replace the conversion sleeve 24, it is just required to draw out the traction pin 231 directly, thus the operation is easy. The end surface of the annular main body can be used as a traction force transmission surface. If the traction force transmission member is provided with a traction block directly between the traction pin 231 and the concave joint 22 instead of being provided with the annular main body, it is also feasible to tightly press the traction pin 231. However, it is obvious that the conversion sleeve 24 as the traction force transmission member can be more reliably positioned in the concave joint 22 in the case that the annular main body itself is radially positioned with respect to the concave joint 22.

On the basis of this, it should be understood that the annular main body is not necessarily limited to a closed annular shape, but may have an opening, as long as it is substantially annular and can realize a radial positioning in the inner cavity of the concave joint 22.

Furthermore, upper and lower ends of the outer peripheral surface of the annular main body are arc-shaped, i.e., have a first arc-shaped surface 241 and a second arc-shaped surface 242 which are oppositely arranged, and two side flat surfaces 244 on two sides thereof, that is, the whole annular main body is substantially drum-shaped. As shown in FIGS. 5 and 6, after being mounted, the first arc-shaped surface 241 and the second arc-shaped surface 242 are located at an upper side and a lower side of the concave joint 22 respectively and are fitted with a top surface and a bottom surface of the concave joint 22 respectively, and arc-shaped edges of the two arc-shaped surfaces are provided with a first spherical edge 241a and a second spherical edge 242a respectively.

Figure 8:
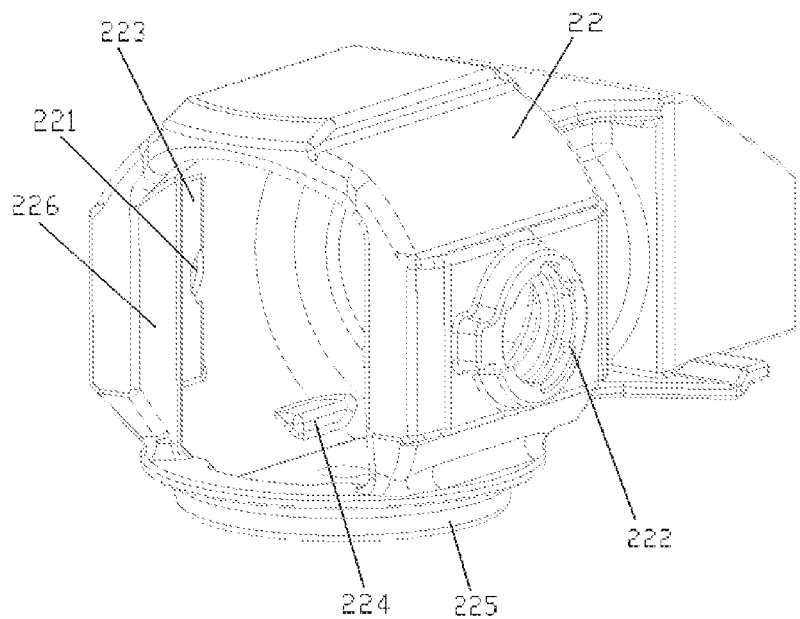
FIG. 8 is a schematic perspective view of the concave joint in FIG. 2.

Referring to FIG. 8, FIG. 8 is a schematic perspective view of the concave joint in FIG. 2.

Two shoulders 223 are provided at two sides of the inner wall of the concave joint 22 and are respectively in contact with the two side flat surfaces 244 on two sides of the annular main body. After being fitted, the two shoulders 223 and the two side flat surfaces 224 are both vertical surfaces. In addition, an inner wall of a front end 226 of the concave joint 22 is a stress plat surface facing toward the annular main body of the conversion sleeve 24. The front end surface of the annular main body is a traction force transmitting surface 245 and is also planar, which is fitted with the stress flat surface of the front end 226 of the concave joint 22, i.e., the concave joint 22 is in surface contact with the conversion sleeve 24 in a transmission direction of the traction force.

The above-mentioned conversion sleeve 24 is installed as follows:

As shown in FIG. 7, the conversion sleeve 24 is transversely placed, and is inserted into the inner cavity of the concave joint 22 from the front end of the concave joint 22, and an insertion direction is indicted by the arrow in FIG. 7;

The conversion sleeve 24 is reversed by 90 degrees in the axial direction (also in the insertion direction) of the concave joint 22 and is then reversed by 90 degrees in the vertical direction of the concave joint 22 (the order of the reversions is not limited.), so that the conversion sleeve 24 is fitted with the concave joint 22, thus, the conversion sleeve 24 is fixed radially (the axial positioning of the conversion sleeve 24 depends on the abutment of the traction pin 231, the positioning of the two radial sides of the conversion sleeve 24 depend on the abutment with the shoulders 223, and the upper and lower radial arc-shaped surfaces of conversion sleeve 24 abut against the upper and lower arc-shaped surfaces of the concave joint 22 to be fixed).

Thus, the spherical surfaces provided on the upper and lower arc-shaped edges of the annular main body allow the conversion sleeve 24 to freely rotate after being fitted, thus realizing installation and positioning. Therefore, with this structural design of the conversion sleeve 24, a simplified installation process is achieved on the premise that the requirement on traction force transmission is met, and a reliable positioning of the conversion sleeve 24 with respect to the concave joint 22 is achieved. Of course, it is also feasible to design the conversion sleeve 24 into a circular or other shapes, however, the mounting difficulty will be greater than that of the drum shape of the above-described embodiment, for example, a mounting hole may be required to be arranged in the upper and lower portions of the concave joint 22; or the traction force transmission member may be designed to be directly fixed to the inner wall of the concave joint 22 through a connecting member. Obviously, although there are many ways to implement the traction force transmission member to transmit force and reduce the wear of the concave joint 22, the structure of the conversion sleeve 24 according to this embodiment is a preferred embodiment and can bring about effects such as easy installation and reliable positioning as described above.

In addition, the conversion sleeve 24 is provided with the support portion 243a having an arc-shaped lateral side so that a surface fit is formed between the traction pin 231 and the conversion sleeve 24, thereby better transmitting the traction force. On the basis of this, a surface fit is formed between the annular main body of the conversion sleeve 24 and the concave joint 22 in the traction force direction, so that the traction pin 231 eventually transmits the traction force to the concave joint 22 in a surface fit manner, thereby uniformly transmitting the load.

For achieving the object, it is also feasible to arrange the lateral side of the support portion 243a in an annular shape (the traction pin 231 is inserted directly in the annular shape). However, with the arrangement of the arc-shape, material can be saved and weight can be reduced, and in another aspect, the traction pin 231 may not come into contact with other portions when transmitting the compressive force, thus, the traction pin 231 may be only subjected to the traction force, thereby reducing wear.

It should be noted that, in the above embodiment, the reason why the traction pin 231 does not transmit the compressive force and the vertical force is that the traction pin 231 is inserted into the head portion of the convex joint 21. This embodiment differs from the background technology in that the compressive force and the vertical force are transmitted through the head portion and the bottom of the convex joint 21 respectively, rather than through the traction pin 231.

It is just because that the traction pin 231 according to this embodiment is only subjected to the traction force so that the requirement imposed on its strength is relatively low, and the traction pin 231 may be formed separately relative to the joint bearing 23. In installation, the convex joint 21 can be inserted horizontally rearward into the concave joint 22 and then the insertion pin 231 may be inserted laterally into the convex joint 21, therefore, it is not necessary to jack up the car body first and then mount the car body as described in the conventional technology, thereby reducing the difficulty in installation and improving the installation efficiency. Of course, the traction pin 231 and the joint bearing 23 may be formed integrally. It may be understood that, in this embodiment, the case of the traction pin 231 being in a horizontal state after being assembled is just an example. In practice, it is also feasible that the convex joint 21 is vertically reversed by 90 degrees and the traction pin 231 is in a vertical state, and in this case, the position of the support portion 243a of the conversion sleeve 24 may just be changed accordingly.

In the Figure, the support portion 243a is provided in the support claw 243, and the support claw 243 protrudes out of the annular main body. It is conceivable that providing the support portion 243a directly on the annular main body can also achieve the purpose of contacting with the traction pin 231, for example, the surface of the annular main body is directly sunken inward to form an arc-shaped support portion 243a. However, in the case that the support claw 243 is provided, a thickness of the annular main body can be reduced, thus the object of weight reduction can be achieved.

Figure 9:
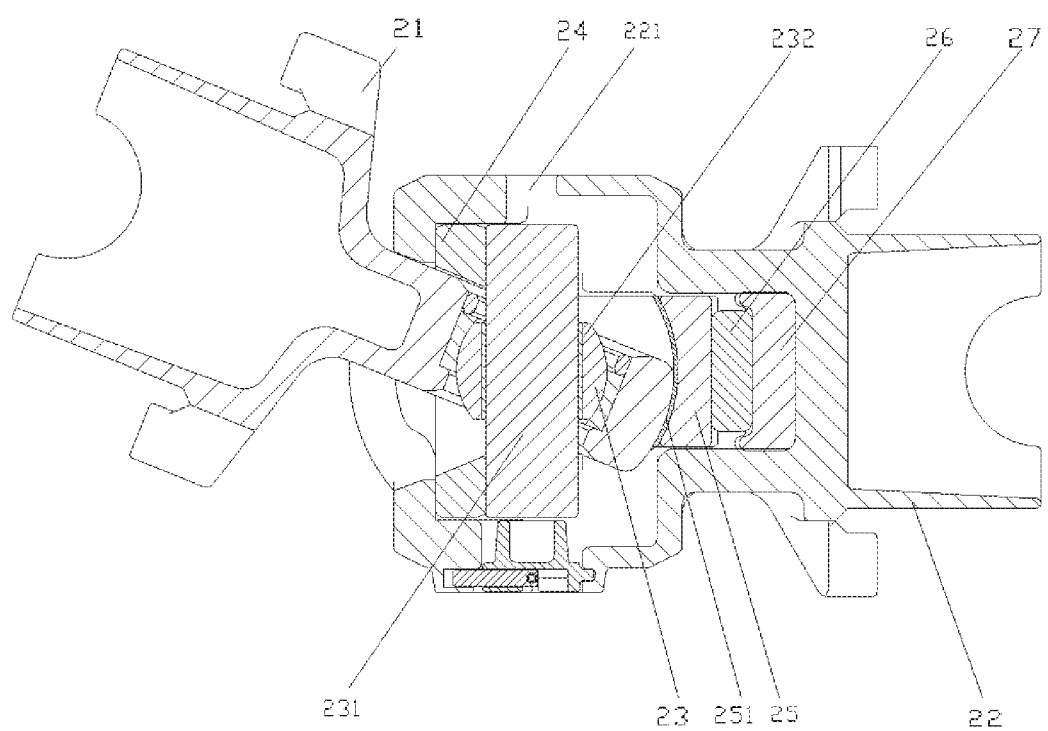
FIG. 9 is a structural schematic view showing the concave joint in FIG. 3 after being swung by a certain angle along a horizontal plane.
Figure 10:
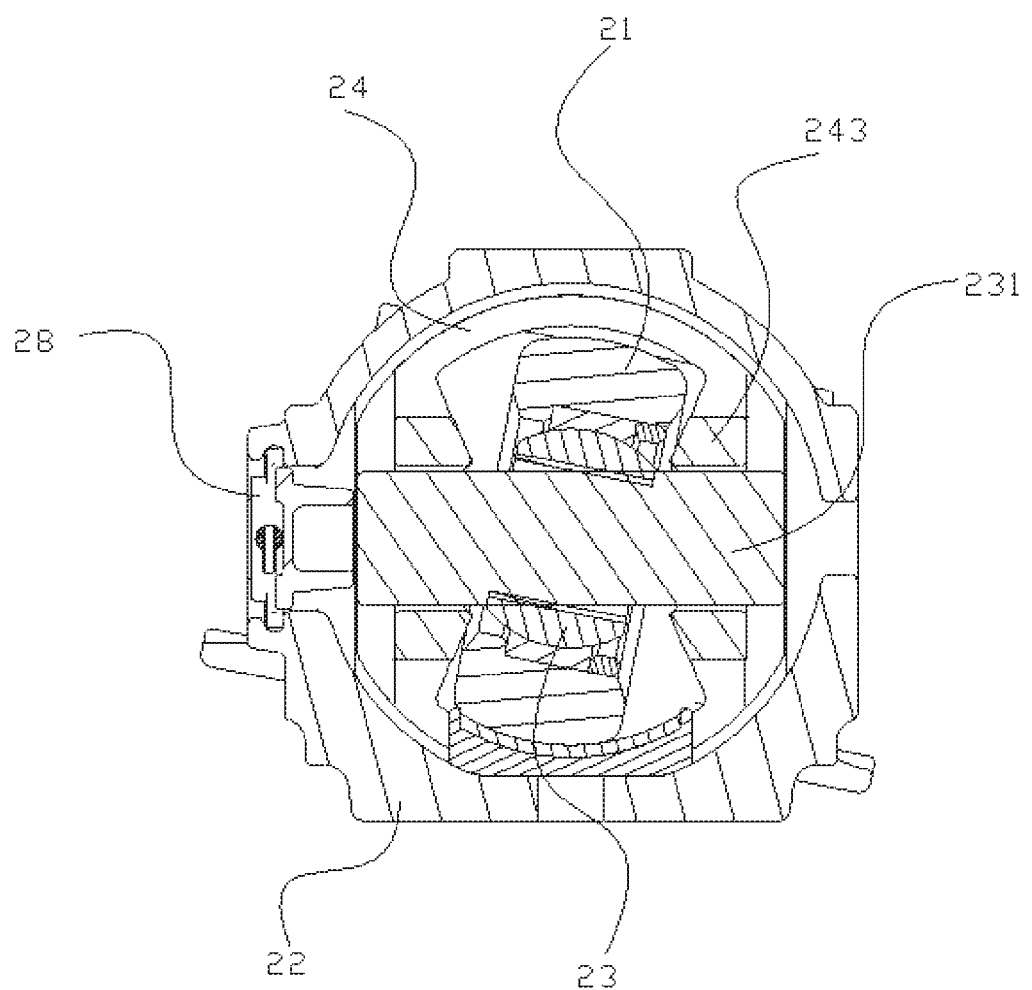
FIG. 10 is a cross sectional view of the joint connector in FIG. 2.

It is noteworthy that, as shown in FIGS. 5 and 6, the inner side of the conversion sleeve 24 is arranged in a bevel outwardly extending from the front direction to the rear direction, to form an inner bevel 246 as illustrated. With such a design, the conversion sleeve 24 does not interfere with the convex joint 21 when the convex joint 21 is swung horizontally, thereby achieving the effect of ensuring the strength of the conversion sleeve 24 and also the rotation of the convex joint 21. As shown in FIG. 9, FIG. 9 is schematic view showing the structure of the concave joint in FIG. 3 after being swung by a certain angle along a horizontal plane. Accordingly, the inner wall of the conversion sleeve 24 is also configured in a circular shape so as not to interfere with a sideward rolling of the convex joint 21. As shown in FIG. 10, FIG. 10 is a cross sectional view of the joint connector in FIG. 2, and the convex joint 21 rolling sideward by a certain angle is shown.

In addition, the support claw 243 provided on the conversion sleeve 24 is arranged in a bevel inwardly extending from the front direction to the rear direction, to form an outer bevel 243b as illustrated. In one aspect, the weight can be reduced; and in another aspect, as described above, the requirement for rotation of the conversion sleeve 24 during installation can be met and the conversion sleeve 24 can be prevented from interfering with the inner wall of the concave joint 22, thus the conversion sleeve can be smoothly mounted and radially fixedly positioned within the concave joint 22.

In the above embodiment, the second wedge 27 is provided as a compressive force transmission member. As shown in FIG. 3, the second wedge 27 may have a notch facing toward the first wedge 26. After being mounted, the first wedge 26 is stuck in the notch to prevent the first wedge 26 and the slave plate 25 from being displaced so as to ensure the self-locking for eliminating the gap.

The second wedge 27 may specifically be plate shaped and is provided with a rib 271 on a side facing toward the inner wall of the concave joint 22. After being mounted, the rib 271 abuts against the concave joint 22. With such an arrangement, the weight of the wedge is reduced on the premise of ensuring that the second wedge 27 can be fixedly positioned relative to the concave joint 22.

Accordingly, it is also feasible that the compressive force transmission member is designed into a non-wedge shape, as long as the compressive force can be transmitted. However, in this embodiment, as a preferred embodiment, the compressive force transmission member is arranged in a wedge shape, because a self-locking can be formed between the compressive force transmission member and the first wedge 26 so as to further ensure that the first wedge 26 can eliminate the gap between the concave joint 22 and the convex joint 21 and effectively transmit the compressive force.

Figure 11:
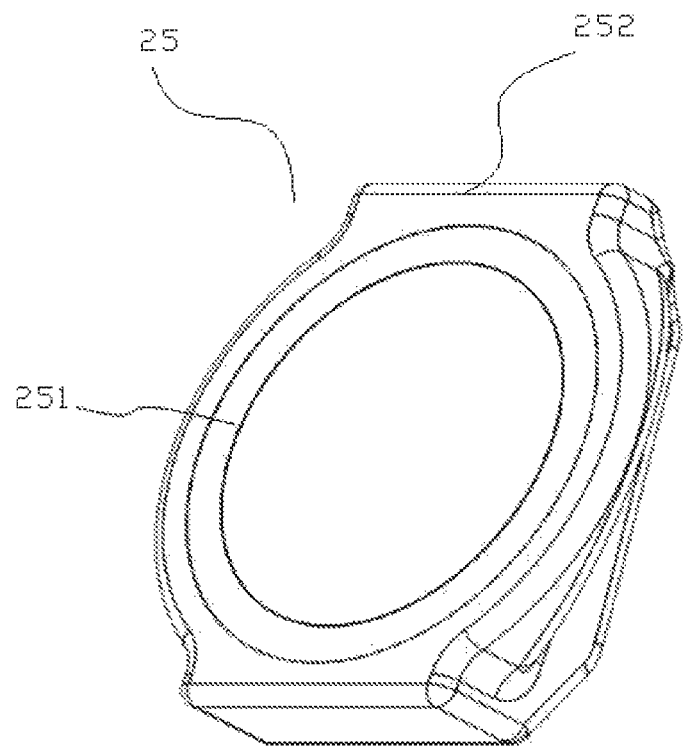
FIG. 11 is a schematic view showing the structure of a slave plate in FIG. 2.
Figure 12:
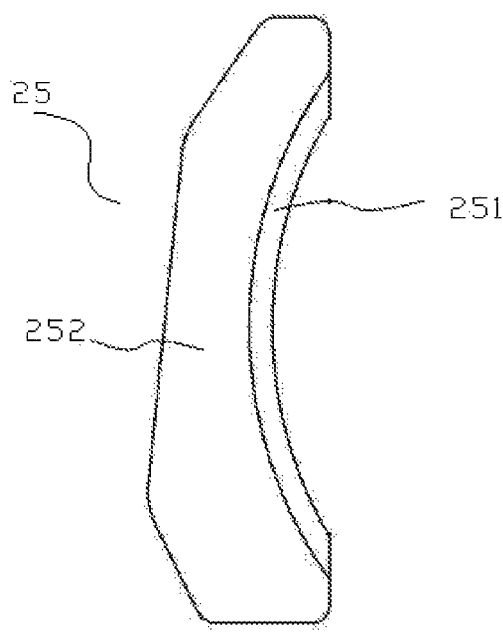
FIG. 12 is an axial sectional view of the slave plate in FIG. 11.

Further improvements may be made to the above embodiments. As shown in FIGS. 2 and 3 and with reference to FIGS. 11 and 12, FIG. 11 is a schematic view showing the structure of a slave plate in FIG. 2; and FIG. 12 is an axial sectional view of the slave plate in FIG. 11.

As illustrated, a wear-resistant bushing, e.g., a slave plate wear-resistant bushing 251 and a support block 291 as shown, may be provided at a side, facing toward the convex joint 21, of the support block 29 and/or the slave plate 25. The wear-resistant bushing is made of non-metallic material. In addition, wear-resistant and self-lubricating material is added to the non-metallic material to control the friction coefficient of the wear-resistant bushing to be not greater than 0.3, which ensures that the convex joint 21 can be subjected to a small friction resistance during the rotation, thus enabling the convex joint 21 to rotate flexibly. Moreover, the strength of the wear-resistant bushing can be set smaller than that of the convex joint 21, to reduce the frictional loss of the convex joint 21 during the rotation and improve the service life of the convex joint 21.

Figure 13:
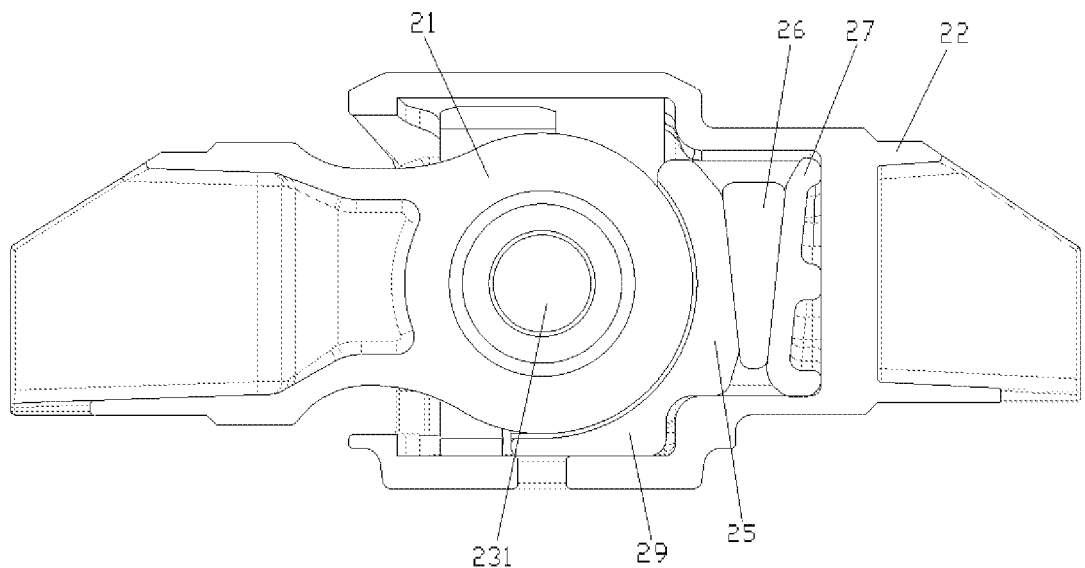
FIG. 13 is a schematic view showing the structure of a support block and a slave plate in the joint connector according to another embodiment of the present application.

As shown in FIG. 13, FIG. 13 is a schematic view showing the structure of another embodiment of a support block and a slave plate in the joint connector according to the present application.

In this embodiment, the support block 29 and the slave plate 25 may also be arranged integrally, thereby further improving the stability of the overall structure.

In order to ensure the positioning effect of the support block 29, two stoppers 224 may also be provided on two sides of the bottom of the concave joint 22 respectively, as shown in FIG. 8. After being mounted, the support block 29 is fixedly positioned transversely between the two stoppers 224 on two sides of the concave joint 22, as shown in FIG. 8.

In addition, a pin holder mounting flange 222 may be provided on one side of the concave joint 22. In the Figure, the flange protrudes outwardly and the pin holder 28 is mounted from this side to axially position the traction pin 231. An assembly and disassembly process hole 221 is provided on another side, i.e., the side opposite to the pin holder mounting flange 222, of the concave joint 22, for facilitating the assembly or disassembly of the traction pin 231.

Figure 14:
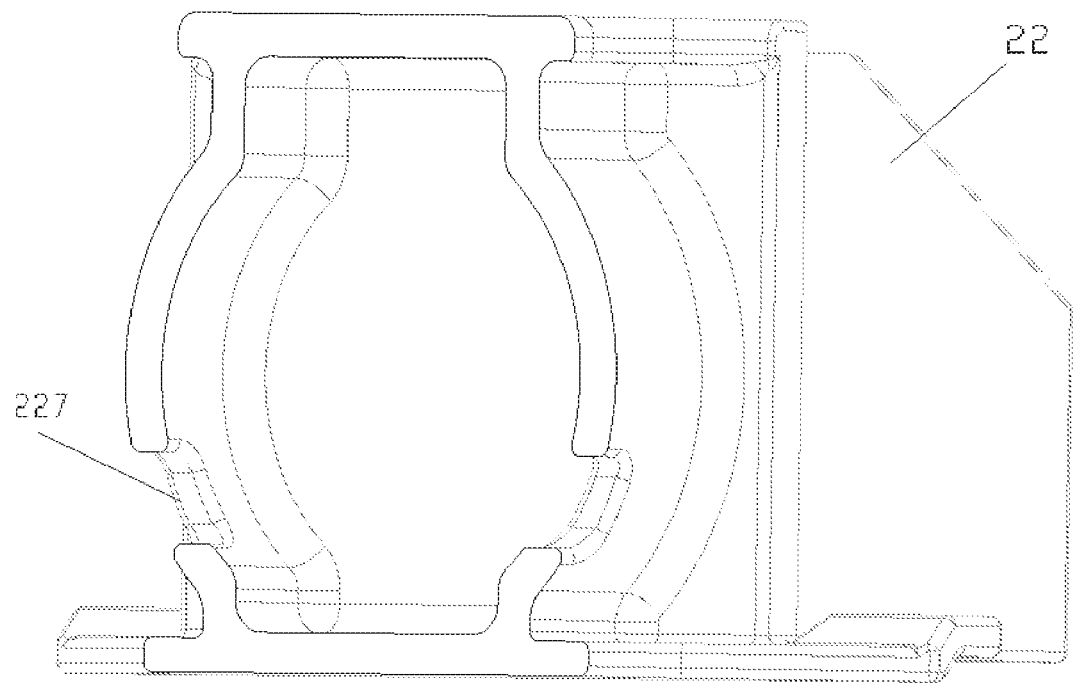
FIG. 14 is a schematic cross-sectional view of a middle section of the concave joint in FIG. 8.

In addition, the concave joint 22 is further provided with wedge process holes 227 arranged oppositely. As shown in FIG. 14, FIG. 14 is a schematic cross-sectional view of a middle section of the concave joint in FIG. 8.

During installation, the slave plate 25, the first wedge 26 and the second wedge 27 are placed first, and then a crowbar is inserted via the wedge process hole 227 for lifting the first wedge 26 so as to leave an appropriate axial space margin for the insertion of the traction pin 231. After being inserted, the crowbar is withdrawn, and under the action of the traction force, the traction pin 231 automatically abuts against the conversion sleeve 24, and the first wedge 26, under the action of the compressive force and its self-weight, forms a self-locking together with the slave plate 25 and the second wedge 27.

It should be noted that in this embodiment, a front inner cavity of the concave joint 22 is designed as a cylindrical surface for fitting with the conversion sleeve 24. An upper center plate 225 is provided in a bottom of a front part of the concave joint 22 so as to match with a lower center plate of a bogie of the car body. A middle section of the concave joint 22 is designed in a way that a cross-section is a combined shape of two arc-shaped sides and U-shaped upper and lower sides, which in one aspect, facilitates the installation of the slave plate 25 and the wedge (the slave plate 25 and the wedge 25 are also designed in corresponding shapes, which has an effect of preventing rotation after installation), and in another aspect, the stress distribution of the cross section having such a shape is more reasonable, which is advantageous in improving the use reliability of the concave joint 22.

Figure 15:
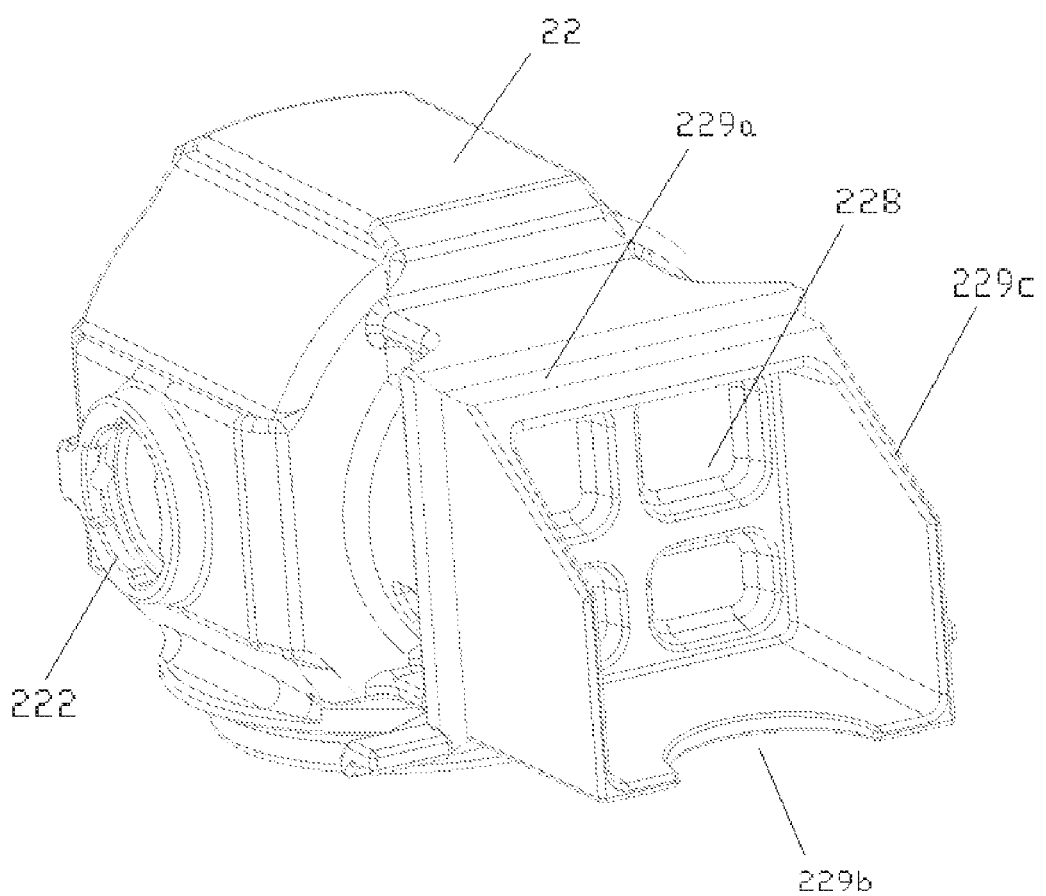
FIG. 15 is a schematic view showing the structure of a tail portion of the concave joint in FIG. 2.

The concave joint 22 may also be further improved, as shown in FIG. 15, FIG. 15 is a schematic view showing the structure of a tail portion of the concave joint in FIG. 2.

The cross-section of the tail portion of the concave joint 22 may be specifically designed as a rectangular structure. A welding groove 229a is provided around a root portion of the concave joint for welding with a middle beam of the car body. An upper portion of the concave joint 22 is removed by a part to form a downwardly inclined tail bevel 229c as illustrated, to facilitate welding of a lower portion of the concave section 22, and to achieve an effect of weight reduction. A bottom of the tail portion of the concave joint 22 is provided with a semicircular opening 229b for being welded with a contact portion of the middle beam of the car body. Two sides of the tail portion of the concave joint 22 are designed to be planar so as to be welded to a process hole in the middle beam of the car body, thereby improving the welding connection strength and ensuring the reliability of connection of the concave joint 22 to the middle beam.

In addition, a process slot 228 may be provided in the root section of the concave joint 22. There are four process slots 228 shown in the Figure, and obviously, the number of the process slots is not limited. The arrangement of the process slots 228 facilitates casting molding of the root section and can reduce the weight of the concave joint 22.

Finally, it should be noted that in the above embodiments, it is described that the convex joint 21 transmits the traction force, the compressive force and the vertical force to the concave joint 22. It may be understood that the concave joint 22 may also in turn transmit the above forces to the convex joint 21. In this case, the traction force transmission member, the compressive force transmission member and the vertical force transmission member perform the same function, which are not be described here.

In addition, the core of the present application is to provide a detachable stress member for reducing the wear of the concave joint 22. Therefore, the specific connection way between the concave joint 22 and the convex joint 21 is not limited, and it is preferable to employ the joint bearing 23 provided with the traction pin 231, so as to ensure that the convex joint 21 is rotated more flexibly. Or, a mating structure of a pin shaft block and a main pin inserted in the head portion of the convex joint 21 may be directly provided to realize the transmission of the traction force.

The above embodiments are only preferred embodiments of the present application. It should be noted that, it is apparent for those skilled in the art to make several improvements and modifications without departing from the principles of the present application, and these improvements and modifications are also deemed to fall into the scope of the present application.

The invention claimed is:

1. A joint connector, comprising a concave joint and a convex joint, between which a traction force and a compressive force are transmittable, wherein a traction force transmission member is provided between the concave joint and the convex joint to transmit traction force, and/or a compressive force transmission member is provided between the concave joint and the convex joint to transmit compressive force, the traction force transmission member and the compressive force transmission member are detachably mounted and positioned in the concave joint;

wherein the convex joint is connected to the concave joint by a joint bearing, a traction pin is provided in the joint bearing and is configured to transmit the traction force to the traction force transmission member;

wherein the traction force transmission member is provided with a support portion matching with an outer periphery of the traction pin, and an end portion of the traction pin is arranged on the support portion;

wherein the traction force transmission member has an outer periphery fitted with an inner cavity of the concave joint to allow the traction force transmission member to be radially positioned in the inner cavity of the concave joint after being fitted; and wherein the traction force transmission member comprises an annular main body and a support claw projecting from a surface of the annular main body, the support portion is formed on the support claw, the annular main body has an outer periphery fitted with the inner cavity of the concave joint.

2. The joint connector according to claim 1, wherein after being mounted, the traction force transmission member and the compressive force transmission member is tightly pressed against the concave joint, to be mounted and fixed to the concave joint and transmit the traction force or the compressive force correspondingly.

3. The joint connector according to claim 2, wherein the convex joint is connected to the concave joint by a joint bearing, a traction pin is provided in the joint bearing and is configured to transmit the traction force to the traction force transmission member.

4. The joint connector according to claim 2, wherein the traction force transmission member is in surface contact with the inner wall of the concave joint in a transmission direction of the traction force.

5. The joint connector according to claim 2, further comprising a slave plate and a first wedge provided between the convex joint and the concave joint, wherein a self-locking is formed between one side of the slave plate and one side of the first wedge, a spherical fit is formed between another side of the slave plate and a head portion of the convex joint;
   the compressive force transmission member comprises a second wedge provided between the first wedge and the concave joint, a self-locking is formed between the second wedge and another side of the first wedge.

6. A railway vehicle, comprising a plurality of car bodies, adjacent two car bodies of which are connected by a joint connector, wherein the joint connector is the joint connector according to claim 2.

7. The joint connector according to claim 1, wherein the support portion has an arc-shaped lateral side.

8. The joint connector according to claim 1, wherein an outer peripheral surface of the annular main body comprises a first arc-shaped surface and a second arc-shaped surface arranged opposite to each other, and side flat surfaces located on two sides of the annular main body respectively;
   the first arc-shaped surface and the second arc-shaped surface are fitted with a top surface and a bottom surface of the concave joint respectively, and two sides of an inner wall of the concave joint are provided with shoulders which are in contact with the side flat surfaces and abut against the side flat surfaces.

9. The joint connector according to claim 8, wherein an inner side of the traction force transmission member is arranged in a bevel extending outwards from front to rear, and the support claw is arranged in a bevel extending inwards from the front to the rear.

10. The joint connector according to claim 1, wherein the traction force transmission member is in surface contact with the inner wall of the concave joint in a transmission direction of the traction force.

11. The joint connector according to claim 1, further comprising a slave plate and a first wedge provided between the convex joint and the concave joint, wherein a self-locking is formed between one side of the slave plate and one side of the first wedge, a spherical fit is formed between another side of the slave plate and a head portion of the convex joint;
   the compressive force transmission member comprises a second wedge provided between the first wedge and the concave joint, a self-locking is formed between the second wedge and another side of the first wedge.

12. The joint connector according to claim 11, wherein a support block is provided between a bottom of the concave joint and the convex joint, and a spherical fit is formed between the support block and the head portion of the convex joint.

13. The joint connector according to claim 12, wherein a stopper configured to restrict a transverse displacement of the support block is provided at the bottom of the concave joint.

14. The joint connector according to claim 11, wherein a wear-resistant bushing, which is in spherical surface contact with the head of the concave joint, is provided at a side, facing toward the convex joint, of the support block and/or the slave plate, and the strength of the wear-resistant bushing is less than the strength of the convex joint.

15. The joint connector according to claim 11, wherein the support block and the slave plate are formed integrally.

16. A railway vehicle, comprising a plurality of car bodies, adjacent two car bodies of which are connected by a joint connector, wherein the joint connector is the joint connector according to claim 1.

* * * * *